W. P. M. GRELCK.
PROCESS FOR TREATING OILS AND FATS.
APPLICATION FILED FEB. 19, 1914.
1,144,539.
Patented June 29, 1915.
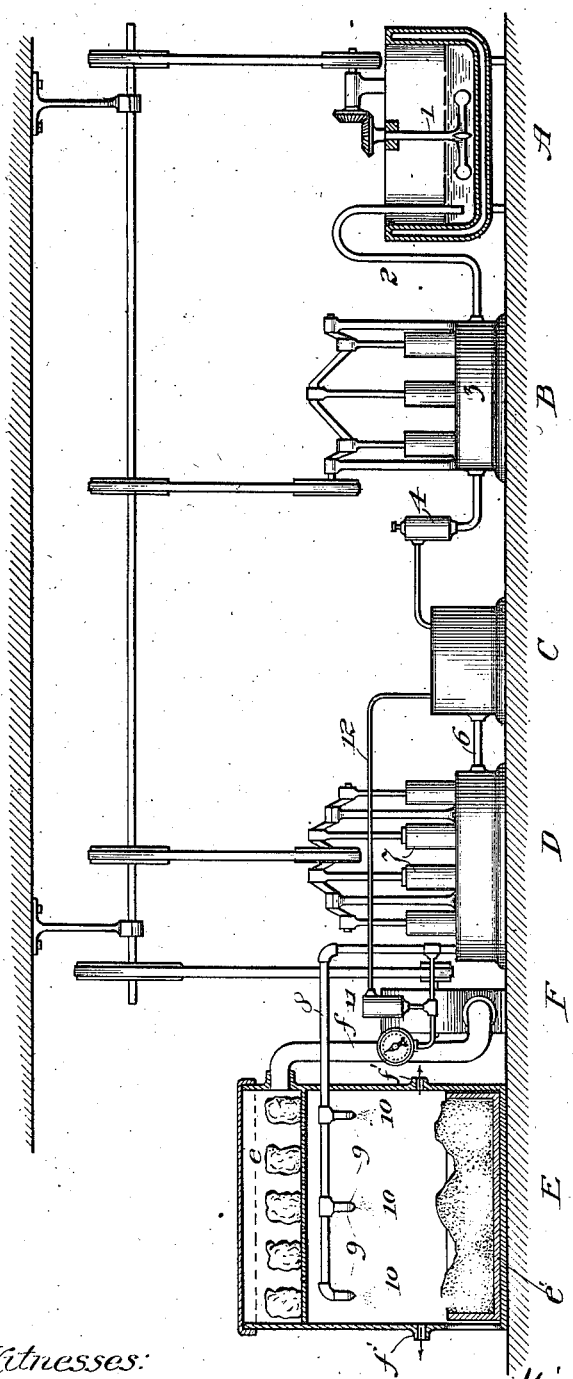

---

UNITED STATES PATENT OFFICE.

WILLIAM P. M. GRELCK, OF ELGIN, ILLINOIS.

PROCESS FOR TREATING OILS AND FATS.

1,144,539.   Specification of Letters Patent.   Patented June 29, 1915.

Application filed February 19, 1914. Serial No. 819,622.

*To all whom it may concern:*

Be it known that I, WILLIAM P. M. GRELCK, a citizen of the United States, residing at the city of Elgin, in the county of Kane and State of Illinois, have invented certain new and useful Improvements in Processes for Treating Oils and Fats, of which the following is a specification.

My invention relates to methods by which fats and oils may be mingled in desired proportions to produce a product which shall be uniform in texture, homogeneous in structure and elegant in appearance, and the component elements of which will not be readily separated by time or changes in temperature. It is especially applicable to the compounding of fats as used in the manufacture of butterin or to the treatment of process butter.

In the usual way in which butterin is made the various fatty materials are melted together and then churned with fresh cream or milk, the butter fats of which are thereby added to the original mass which also takes the flavor and odor of the milk and cream. The mixture is then cooled by discharging it in very cold or ice water, after which it is salted and prepared for the market. But in cooling the mass in water much of the flavor and aroma of the natural butter fat and milk are washed out and lost, thus impairing the quality of the product or necessitating an additional amount of the natural material to compensate for the loss and produce the desired result. By applying the principles of my invention to the manufacture of butterin, I am able to do away with the cooling in water and consequent loss of material, flavor and aroma. I produce a more homogeneous material and one of better texture, while giving it a fresher and more natural quality.

By way of explaining the principles of my invention reference is had to the drawings, which are diagrammatic in character. They do not represent the details of mechanism which may be used to carry my invention into effect, for this may be done by many variations of the mechanical means used therefor.

In the drawings: A represents a jacketed mixing kettle, provided with a rotary stirrer 1. It is connected by the pipe 2 to a homogenizing apparatus B, consisting of a pump 3 and an adjustable homogenizing valve 4.

C is a tank into which the homogenized material may be discharged, and from which it may be drawn by the pipe 6 to a compression apparatus represented by D. This is provided with a series of pumps 7 by which the material is forced through the pipe 8 to the cooling chamber E. The pipe 8 is provided with appropriately constructed nozzles 9 by which spray jets 10 are formed. Over-pressure beyond the capacity of the nozzles is relieved by the valve 11, which permits surplus material, which otherwise would go into the nozzles, to be returned through the pipe 12 to the tank C.

The number of fats and fatty materials which may be used in the manufacture of butterin is great, and the proportions in which they are used may be almost indefinitely varied. One principal object in selecting the materials and arranging the proportions thereof is to make a product of substantially the consistency of butter and which will melt at practically the same temperature. This result depends largely upon the proportion of stearin used, either as a direct ingredient or as a constituent of other elements. To this end a combination of fats is selected which will contribute the proper proportion of stearin. A typical low grade butterin formula is 25 lbs. of beef stearin, 55 lbs. cottonseed oil, and 20 lbs. well ripened milk. The milk or cream which is added contributes in addition to the butter fats the butter flavor and a certain proportion of water corresponding to that contained in natural butter.

When it is desired to prepare a quantity of butterin in accordance with the principles of my invention, fats in the proper proportion are placed in the kettle 1, and therein heated and stirred until a mixture is made. The desired milk and cream may also be added and a sufficient quantity of salt. When all are thoroughly incorporated, the fluids are passed through the homogenizing valve 4 by the action of the pumps. The action of a homogenizer under such circumstances is well known and it is sufficient to say that the material being passed through the valve at a pressure of several thousand pounds to the square inch the globules of fat are broken to a size much less than before being thus treated. They are thus able to come into closer relation with each other and to form a thoroughly uniform and highly homogeneous mixture.

This intimate mixture of finely divided and attenuated fat particles is fixed and the particles left in positive relation by converting the mass into a nebular form and then instantly cooling it while in that state. To do this the homogenized material is conducted from the receiving tank C by means of a compressor as shown at D, to the chill room E. The latter should be provided with an ice chamber e whereby the temperature may be reduced to approximately 50 degrees Fahr., or below, as desired. It should also be provided with means whereby trays e' may be so placed as to receive the treated mixture when passed through the atomizing heads or nozzles 9. The mixture being led to the upper part of the cooling room and discharged through said heads, forms a fine mist which spreads out and mingles with the cooler air of the room. The surplus heat is instantly abstracted and the constituent elements are simultaneously hardened in fixed relation to each other. The solidified particles fall to the bottom of the room where they are received by the trays e' in a light but thoroughly mixed and homogeneous mass. This can at once be worked to bring it to a condition of proper density and prepared for the market without further treatment or manipulation.

I find that the atomized or finely divided spray of oil or grease by being so intimately mingled with the air is oxidized and thereby more or less bleached and decidedly deodorized. Therefore in the treatment of butterin described, the cooling chamber should be kept closed and the air therein changed as little as possible while the process is in operation.

This brings me to a modification of my process which is applicable when used as it may be for the manufacture of compound lard and the like, in which it is an advantage to have the same as white and free from odor as possible. The ingredients of compound lard vary greatly, but the fundamental principle thereof is the same as stated with respect to butter above, viz., to supply a sufficient amount of stearin to produce the required consistency in the finished product. When making such products by means of my invention the air should be changed as frequently as possible and preferably changed continuously in the cooling chamber. For this purpose a blower F may be provided by which, under proper regulation, through the pipe f, a current of air may be driven into the ice chamber e, wherein it falls mingling with the material sprayed from the heads 9, oxidizing and instantly chilling it. Suitably controlled outlets as at f' provide for complete regulation of the amount of air passing through the chill room. In working this phase of my process it is not always necessary to use the homogenizing apparatus. The mingled fats or oils may in some cases pass by the apparatus represented by B and be pumped directly to the spray jets. This is a matter within the skill and experience of the operator, but is fully within the scope of my invention or so much thereof as consists of converting the mingled fats and oils into a spray or a nebulous form and cooling the same in an air medium while in that condition.

In describing my process and in the claims therefor I have purposely used a variety of language to describe that step in my process and the condition in which the material is released and subjected to the action of a cooling medium. But whether the material is described as being atomized or in the form of a spray or in a nebulous condition, a finely divided form is to be understood irrespective of the means by which the result is reached or the exact nature or extent of the comminution. And while I have illustrated the application of my process to the production of butterin and compound lard, it is also applicable to the preparation of any fatty product in which the materials are mingled to form a homogeneous mass.

I claim:

1. The process of making fatty compounds which consists in intimately mixing the component materials, treating the resulting compound to form a spray and then congealing the spray.

2. The process of making fatty compounds which consists in intimately mixing the component materials, treating the resulting compound to form a spray and causing the spray to be congealed by contact with a limited air body of lower relative temperature.

3. The process of making fatty compounds which consists in intimately mixing the component materials, treating the resulting compound to form a spray and receiving the spray in gaseous fluid of relatively lower temperature.

4. The process of making fatty compounds which consists in intimately mixing the component materials, atomizing the resulting compound, and then congealing the atomized compound.

5. The process of making fatty compounds which consists in intimately mixing the component materials, atomizing the resulting compound and causing the atomized compound to be congealed by contact with air of relatively lower temperature.

6. The process of making fatty compounds which consists in intimately mixing the component materials, atomizing the resulting compound, and receiving the atomized compound in gaseous fluid of relatively lower temperature.

7. The process of making fatty compounds which consists in intimately mixing the component materials, treating the resulting compound to form a spray, causing the spray to come in contact with a body of air of relatively lower temperature, and continuously changing the cooling air body.

8. The process of making fatty compounds which consists in intimately mixing the component materials, homogenizing the mixture, atomizing the homogenized product, and causing the same to be received in a fluid of lower relative temperature.

9. The process of making fatty compounds which consists in mixing the component materials, homogenizing the mixture, treating the homogenized product to form a spray, causing the spray to come in contact with an air body of relatively lower temperature and continuously changing the air body.

In witness whereof, I have hereunto subscribed my name this 16th day of February 1914, in the presence of two subscribing witnesses.

WILLIAM P. M. GRELCK.

Witnesses:
C. K. CHAMBERLAIN,
JOHN W. HALL.